ns
3,142,647
N-HALO ORGANIC COMPOUNDS HAVING
IMPROVED WATER-WETTABILITY
George U. Glasgow, New York, N.Y., assignor to
Wallace & Tiernan Inc., a corporation of Delaware
No Drawing. Filed May 27, 1960, Ser. No. 32,114
10 Claims. (Cl. 252—187)

This invention relates to N-halo organic compounds. More particularly, this invention relates to N-halo organic compound-containing compositions having improved water-wettability and to a process of making the same.

N-halo organic compounds or organic compounds containing N-halo group or groups are organic nitrogen-containing compounds possessing a trivalent nitrogen atom wherein one or two halogen atoms, chlorine, bromine or iodine, are attached to the trivalent nitrogen atom, the remaining nitrogen valence bond or bonds being attached to the residue of said compound.

N-halo organic compounds can be represented by the generalized structural formula

wherein X is a halogen atom having an atomic weight greater than 20, such as a halogen atom selected from the group consisting of chlorine, bromine and iodine, R is a residue of said compound, such as a hydrocarbyl radical, i.e., an organic radical containing only carbon and hydrogen atoms, or an organic radical containing only atoms selected from the group consisting of sulfur, carbon, hydrogen, oxygen and nitrogen atoms, and A is another halogen atom the same as or different from X or other element or radical such as hydrogen or a hydrocarbyl radical or A may be R in the instance where R is attached by a double valence bond to the nitrogen atom N.

N-halo organic compounds or compositions containing these compounds are useful as disinfecting agents, sterilizing agents, water treating agents, bleaching agents and the like, since upon contact with or dissolution in water these compounds give rise to active chlorine as hypochlorous acid, which is particularly effective as a bleaching, sterilizing or germicidal agent.

N-halo compounds are widely used in aqueous solutions and therefore the water solubility or water-wettability of these compounds is an important property thereof. Particular applications of N-halo organic compounds, such as trichloromelamine and 1,3-dichloro 5,5-dimethyl hydantoin, accordingly have included the use of these materials in rinse waters for dishes and glasses and for cooking and eating utensils, as water sterilization agents for bathing or drinking purposes, as bleaching agents for clothes, etc. Frequently, it is preferred to use a particular N-halo organic compound over other compounds, even other N-halo compounds, which generate active chlorine upon contact with water even though the particular N-halo organic compound employed is not readily water-wettable or is substantially non-water-wettable, although water soluble, because the particular N-halo organic compound possesses superior properties for the application under consideration. For example, although trichloromelamine is relatively water-repellent or non-water-wettable, this N-halo compound is an excellent material for use in the preparation of a germicidal rinse for dishes and the like since not only does trichloromelamine possess excellent germicidal or bactericidal properties but also is particularly superior to other similar germicidal compounds in the presence of organic matter.

In such uses, particularly for use as a water treating agent, a bleaching agent and as a rinse water additive, it is very desirable that the N-halo compound employed dissolve rapidly and completely in water at about room temperature or the treatment temperature employed. Otherwise, the resulting solutions tend to deposit undissolved particles of the solid N-halo organic compound or the N-halo compound forms a scum on the surface of the solution or leaves behind or causes to collect solid undissolved particles of the N-halo compound on the solid surfaces in contact therewith. When the N-halo organic compound is employed as a germicidal rinse for glassware, such undissolved N-halo compound particles cause objectionable streaking and spotting in the glassware and, as a result, often require an additional rinse or treatment. It is obvious, therefore, that it would be advantageous to improve the water-wettability of N-halo organic compounds, particularly such N-halo compounds which are relatively non-water-wettable or water repellent and which are sold as germicidal rinsing agents or water treating agents.

Accordingly, it is an object of this invention to provide N-halo organic compounds or N-halo organic compound containing compositions having improved water-wettability.

Another object of this invention is to provide treated N-halo organic compounds which evidence improved water-wettability and water dissolution properties and which can readily be employed as germicidal rinsing, bleaching or treating agents in aqueous solutions.

Still another object of this invention is to provide a method for the manufacture of N-halo organic compounds having improved water-wettability.

Still another object of this invention is to provide N-halo organic compounds having improved commercial utility.

Yet another object of this invention is to provide an improved method of effecting dissolution of N-halo organic compounds in water.

How these and other objects of this invention are achieved will become apparent in the light of the accompanying disclosure.

In accordance with this invention it has now been discovered that normally solid, particle-form N-halo organic compounds containing a wetting agent or surface active agent deposited on the surfaces thereof possess improved water-wettability and utility particularly when employed in aqueous solutions. The improved N-halo organic compounds are produced or obtained in accordance with this invention by contacting the solid, particle-form N-halo organic compound with a wetting agent or surfactant (surface active agent) in the presence of water or other suitable solvent for said wetting agent in an amount sufficient to dissolve at least a portion of said wetting agent, thereby forming a solution thereof, the resulting formed solution wetting the surfaces of said particle-form N-halo compound in contact therewith. The resulting wetted N-halo compound is then treated, such as by drying, to remove the solvent or water and to deposit the wetting agent on the surfaces of the particle-form N-halo organic compound. In the practice of this invention sufficient solvent, water, is used to substantially completely wet the surfaces of the particle-form N-halo compound with the solution containing the wetting agent dissolved therein.

Various methods, all employing and embodying the practices of this invention, may be used to effect the deposition of the wetting agent uniformly and substantially completely on the surfaces of the N-halo organic compound undergoing treatment in order to improve the water-wettability thereof.

It is preferred that the N-halo organic compound being treated in accordance with the practice of this invention be contacted with an aqueous solution of wetting agent during the manufacture of the N-halo compound or directly subsequent thereto. For example, in the manufacture of an N-halo organic compound such as trichloromelamine, melamine or a chloromelamine containing a smaller number of substituent chlorine atoms is chlorinated in an aqueous solution by contact with chlorine. After the required amount of chlorine has been adsorbed and chemically reacted with the melamine to produce trichloromelamine, the aqueous suspension containing solid, particle-form trichloromelamine dispersed or suspended therein is pumped from the chlorination reaction vessel to suitable means, such as a filter, e.g., filter press, for the recovery of solid trichloromelamine. During the recovery operation wherein the trichloromelamine is separated by filtration, particularly at about the end of the filtering operation when the last amount of aqueous trichloromelamine suspension is being pumped or moved to the filter press, the substantially trichloromelamine-free filtrate is returned or recirculated to the feed tank or reaction vessel originally containing the aqueous trichloromelamine suspension for supply to the filter. An aqueous solution of wetting agent, such as a concentrated solution of an anionic wetting agent in an amount in the range 20–75% by weight based on the aqueous solution, is then added to the feed tank or reaction vessel for circulation through the filter. The aqueous solution of wetting agent is circulated through the filter for a sufficient period of time, such as a time in the range 0.02–2.0 hours, to substantially completely wet the surfaces of the previously separated and filtered solid, particle-form trichloromelamine within the filter. During this contacting operation the solution of the water soluble wetting agent completely wets the surfaces of the trichloromelamine with the result that the trichloromelamine adsorbs on the surfaces thereof substantially the wetting agent. In a typical contacting operation, trichloromelamine would adsorb at least about 50% by weight, usually 75–90% by weight of the wetting agent dissolved in the aqueous treating solution. Following the completion of the contacting operation the filtrate resulting is then passed to waste and the resulting wetted trichloromelamine removed from the filter and treated for removal of water therefrom.

The drying or water removal step is usually effected by air drying at about room temperature or a temperature in the range 20–80° C., more or less, and below a melting point or decomposition temperature of the trichloromelamine or the N-halo organic compound undergoing treatment. In the instance wherein the N-halo compound undergoing treatment and/or the wetting agent deposited and adsorbed on the surfaces thereof are temperature sensitive, vacuum drying at a pressure in the range 2–600 mm. Hg absolute and at a relatively low temperature, such as a temperature in the range 15–50° C., more or less, may be employed.

In another method in accordance with this invention for effecting contact between the particle-form N-halo compound, such as trichloromelamine, being treated to improve its water-wettability, dry, particle-form trichloromelamine is slurried in an aqueous solution of a suitable wetting agent, such as an anionic wetting agent, and the resulting slurry filtered. The filtered, treated trichloromelamine is then dried so as to deposit on the surfaces thereof solid wetting agent. This method of treating an N-halo organic compound to improve the water-wettability thereof yields a satisfactory product, however the improvement in water-wettability and solution rate is not as pronounced as that obtained when the N-halo compound is treated substantially directly after manufacture on or within a filter such as a filter press by passing therethrough and in contact therewith an aqueous solution of wetting agent.

Still another method of effecting contact between the N-halo compound undergoing treatment and an aqueous solution of wetting agent so as to improve the water wettability and solution rate of the N-halo compound, the particle-form N-halo compound, such as the afore- said trichloromelamine, is recovered from the reaction mixture by filtration in the usual manner and the resulting filtered wet cake of trichloromelamine, upon removal from the filter, is slurried with an aqueous solution of a wetting agent and the resulting slurry filtered. The refiltered trichloromelamine is then recovered from the filter and dried to yield a treated trichloromelamine product containing a wetting agent substantially uniformly deposited on the surfaces thereof. The N-halo compound, trichloromelamine, treated in this manner, however, does not evidence to as high a degree the improvement in water-wettability and dissolution rate as that evidenced by trichloromelamine which has been contacted directly with the aqueous wetting agent treating solution within the filter press as described hereinabove. It appears that once the N-halo compound has been filtered to a compact mass the N-halo compound does not as readily adsorb the wetting agent.

Still another method in accordance with this invention of contacting a solid, particle-form N-halo compound to improve the water-wettability thereof involves forming a paste of solid, particle-form N-halo compound, such as trichloromelamine, with water and a suitable wetting agent or with an aqueous solution of the wetting agent and then drying the resulting paste. The paste-forming operation is carried out in the presence of sufficient water or aqueous solution and under conditions so as to completely wet the surfaces of the particle-form N-halo compound being treated. Desirably, also sufficient wetting agent is employed in combination with water so that the added wetting agent upon dissolution within the water and distribution onto the surfaces of the N-halo compound and subsequent drying is uniformly deposited so as to substantially completely cover the surfaces of the N-halo compound.

The particle-form N-halo compounds prepared in accordance with the practice of this invention are characterized by an extremely rapid dispersion in water with a resulting rapid rate of solution and the resulting solutions are substantially free of undissolved solid particles of the treated N-halo compound and, further, exhibit improved water-wettability and greater water dissolution rate as compared with similar untreated N-halo compounds, such as trichloromelamine, which have been merely admixed with wetting agent in the dry state and micropulverized.

The practice of this invention is generally applicable to all N-halo compounds but is particularly applicable to N-chloro compounds. Those N-halo compounds which are water repellent or which upon admixture with water exhibit apparently only little water solubility and difficulty in dissolution are particularly advantageously treated in accordance with the practice of this invention. N-halo compounds which do not contain any substituent water-solubilizing or hydrophilic groups as well as those N-halo compounds which include a substituent hydrophobic or oleophilic group are most advantageously treated in accordance with this invention to improve the water solubility thereof.

Compounds which are suitably treated in accordance with this invention to improve their water-wettability include such compounds as N-halo derivatives of melamine, ammeline, ammelide, cyanuric acid, particularly such compounds as the halogenated, e.g., chlorinated, melamines from monohalo derivatives to hexahalomelamine, the chlorinated melamines up to hexachloromelamine, the brominated melamines up to hexabromomelamine, dichloramine T, dichloramine B, dibromamine T, dibromamine B, the dihalodimethyl hydantoins such as dibromodimethyl hydantoin and dichlorodimethyl hydantoin, mixed bromo-chloro, N-halo compounds such as monobromo monochlorodimethyl hydantoin, monobromo dichloro melamine as well as such N-halo compounds as dichlorocyanuric acid. It is mentioned that the resulting treated N-halo compounds are useful at substantially all pH values.

In the practice of this invention any suitable wetting agent or surface active agent may be employed provided it is chemically compatible with the N-halo compound upon which it is deposited or adsorbed during the treating operations and upon storage in the sense that it does not undergo chemical reaction therewith to the extent to destroy its commercial utility. The wetting agent or surface active agent employed may be an anionic wetting agent, a cationic wetting agent or a non-ionic wetting agent. It is preferred in the practice of this invention to employ an anionic wetting agent. Anionic wetting agents suitable for use in the practice of this invention include such anionic wetting agents as the alkyl aryl sulfonates, sodium alkyl aryl sulfonates, dodecyl benzene sulfonate, the sulfated higher fatty alcohols such as sodium lauryl sulfate, the fatty acid soaps and rosin soaps, the alkane sulfonic acids and the like. Cationic surfactants such as amine salts of primary, secondary and tertiary amines wherein the amino group is joined directly to a hydrophobic group, as well as quaternary ammonium compounds and non-quaternary nitrogen bases and non-nitrogen bases such as phosphonium compounds are also useful. Also useful in the practice of this invention are the non-ionic surfactants or wetting agents such as fatty acid esters, fatty acid monoglycerides and polyethylene glycols and derivatives thereof and the like. For additional surface active agents, reference is made to the publication "Surface Active Agents, Their Chemistry and Technology" by A. M. Schwartz and J. W. Perry, published 1949 by Interscience Publishers, Inc., New York, particularly pages 1–21 thereof, the disclosures of this publication are herein incorporated and made part of this disclosure.

The resulting treated N-halo compounds containing wetting agent adsorbed or deposited on the surfaces thereof usually comprise a major amount by weight of the N-halo compound and a minor amount by weight, usually in the range 0.5–50%, such as an amount in the range 1–25%, wetting agent. Higher amounts of wetting agent may be employed, if desired, or, if necessary. If desired, a water soluble diluent such as a water soluble inorganic salt, such as a water soluble inorganic sodium salt may be employed in admixture with the treated N-halo compound. These water soluble diluents can be admixed directly with the dry, treated N-halo compound or admixed with the cake or paste of the N-halo compound-wetting agent mixture and the resulting paste dried to a powder. Either method or combination of these methods may be employed to give complete mixtures suitable for a given application. In addition to serving as a diluent or filling agent, these water soluble salts may also serve as pH control or as buffer agents for the preparation of more stable and/or more effective solutions of the treated N-halo compounds.

Examples of complete mixtures ready for use and containing a treated N-halo compound and a water soluble filling agent or diluent such as sodium chloride, sodium sulfate, magnesium sulfate or sodium citrate and the like are as follows: A dry mixture comprising 25% by weight trichloromelamine, 5% by weight sodium alkyl aryl sulfonate and 70% by weight sodium chloride. In preparing such an admixture the sodium chloride could be added to the treated trichloromelamine (trichloromelamine containing sodium alkyl aryl sulfonate, e.g., Nacconol NR, deposited on the surfaces thereof) either before or after drying. The above complete mixture is particularly useful for sterilizing ion exchange resins or for the preparation of germicidal rinses.

Another dry mixture ready for use comprises 25% by weight 1,3-dichloro 5,5-dimethyl hydantoin, 10% by weight sodium lauryl sulfate, 40% by weight anhydrous monosodium phosphate and 25% by weight anhydrous disodium phosphate. The phosphate diluents in the above admixture could be admixed directly with the dry treated N-halo compound. The above admixture is particularly useful for the preparation of a germicidal rinse.

Another complete dry mixture comprises 20% by weight trichloromelamine, 10% by weight dodecyl benzene sulfonate, 10% by weight citric acid and 60% by weight anhydrous monosodium phosphate. The above admixture could be prepared by admixing the citric acid and phosphate salt to the dry treated N-halo compound. The above admixture is particularly useful in the preparation of a germicidal rinse.

Complete mixtures prepared in accordance with this invention containing a treated N-halo compound (N-halo compound containing a wetting agent adsorbed or deposited on the surface thereof) and a solid, water soluble diluent salt would contain a major or a minor amount of water soluble diluent salt therein such as an amount of diluent salt in the range 20–90% by weight based on the total admixture, the proportions of N-halo compound and wetting agent being as disclosed herein.

The following examples are illustrative of the practice of this invention.

EXAMPLE NO. 1

105 pounds of melamine were slurried in water in a 600 gallon crock and chlorinated with 178 pounds of chlorine to form trichloromelamine. At the end of the chlorination reaction, the resulting reaction mixture comprising an aqueous slurry of solid trichloromelamine was pumped through a filter press to filter out the solid, particle-form-trichloromelamine. As the last amount of the slurry left the crock to enter the filter press, clear filtrate from the filter press was pumped back into the tank. Thirty-six pounds of sodium alkyl aryl sulfonate dissolved in 10 gallons of water was then added to the crock and directly pumped into the filter press to contact the filtered, wet cake of trichloromelamine therein. The filtering operation was continued and the aqueous solution wetting agent pumped through the filter cake while recycling the resulting filtrate back into the crock. This filtering and recycling operation was carried on for about 30 minutes, a sufficient time to allow the aqueous solution of wetting agent to be uniformly and completely distributed throughout the filter cake of trichloromelamine within the filter press. At the end of about one-half hour, there were approximately 10 gallons of clear liquor left in the crock and, upon analysis, this clear liquor was shown to contain about 6 pounds of the sodium alkyl aryl sulfonate wetting agent, thereby indicating that about 30 pounds of the wetting agent were distributed throughout the 180 pounds of the trichloromelamine in the filter press. The filter press was then opened and the filter cake of trichloromelamine, now wetted with an aqueous solution of sodium alkyl aryl sulfonate was discharged therefrom and dried. Upon testing, the dried, treated trichloromelamine was found to be very water-wettable and a highly water-dispersible material with a high water solubility rate as compared with a material, an admixture of solid trichloromelamine and the same wetting agent, sodium alkyl aryl sulfonate, prepared by mixing and micropulverizing these materials in the same ratio in the dry state. The treated trichloromelamine product prepared in accordance with this invention proved to be markedly superior in water wettability, water dispersibility and water solubility rate as compared with untreated trichloromelamine or as compared with the above-mentioned micropulverized admixture.

As indicated in the foregoing example it is preferred that the filtered N-halo compound, trichloromelamine, be contacted directly with the aqueous wetting agent solution without an intervening washing step. Moreover, it is mentioned that, if desired, all or part of the wetting agent can be incorporated in the reaction mixture, either before or directly after chlorination and prior to filtering.

EXAMPLE NO. 2

The same materials and procedures employed and set forth in connection with Example No. 1 were followed save the aqueous sodium alkyl aryl sulfonate wetting agent solution was not added until all of the trichloromelamine slurry had been filtered through the filter press. The aqueous wetting agent solution was recycled through the filter press for about one-half hour and then sent to waste. The thus-treated trichloromelamine was removed from the filter press and dried and was found to be a highly water-wettable and water-dispersible material. The thus-treated trichloromelamine was slightly inferior with respect to water-wettability and water solution rate as compared with the trichloromelamine product prepared in accordance with Example No. 1 but was found to be superior to a somewhat similar product prepared by micropulverizing the same ingredients in the same proportions together in the dry state.

EXAMPLE NO. 3

Dry, particle-form trichloromelamine was processed by four different procedures and the products compared with respect to water-wettability, water-dispersibility and water-solubility rate. The products were tested by adding 1 gram of each product to 200 ml. of tap water and observing wettability and completeness of solution.

Table 1

| Product | Parts by Weight | | | | Process Details | Solubility Properties |
|---|---|---|---|---|---|---|
| | Trichloromelamine | Sodium alkyl aryl sulfonate | NaCl | Water | | |
| A | 25 | 5 | 70 | | Mixed dry | Very poor wettability, partially undissolved after 24 hours. |
| B | 25 | | 75 | 50 | Mixed paste and air dried. | Do. |
| C | 25 | 1 | 74 | 50 | do | Better wettability but still some undissolved after 24 hours. |
| D | 25 | 5 | 70 | 50 | do | Excellent wettability, bulk of material dissolved in few seconds. |

EXAMPLE NO. 4

Ten grams of 1,3-dichloro 5,5-dimethyl hydantoin were slurried with an aqueous solution of 1 gram of sodium alkyl aryl sulfonate (Nacconol NR) in 7.5 grams of water. The resulting slurry was air dried at 40° C. The dry powder thus made was found to be markedly superior in water-wettability and water-solubility rate as compared to a powder prepared by grinding these same ingredients together in the same proportions and in the dry state.

EXAMPLE NO. 5

Ten grams of trichlorocyanuric acid were slurried with an aqueous solution of 1 gram of sodium alkyl aryl sulfonate (Nacconol NR) in 7.5 grams of water. The resulting slurry was air dried at 40° C. The dry powder thus made was found to be superior in water-wettability and water-solubility rate as compared to a powder prepared by grinding these same ingredients together in the same proportions and in the dry state.

EXAMPLE NO. 6

Ten grams of tribromomelamine were slurried with an aqueous solution of 1 gram of sodium alkyl aryl sulfonate (Nacconol NR) in 7.5 grams of water. The resulting slurry was air dried at 40° C. The dry powder thus made was found to be superior in water-wettability and water-solubility rate as compared to a powder prepared by grinding these same ingredients together in the same proportions and in the dry state.

EXAMPLE NO. 7

Ten grams of monobromo dichloro melamine were slurried with an aqueous solution of 1 gram of sodium alkyl aryl sulfonate (Nacconol NR) in 7.5 grams of water. The resulting slurry was air dried at 40° C. The dry powder thus made was found to be superior in water-wettability and water-solubility rate as compared to a powder prepared by grinding these same ingredients together in the same proportions and in the dry state.

EXAMPLE NO. 8

Twenty-five grams of trichloromelamine, 5 grams of dodecyl benzene sulfonate (Sulframin AB–85), 75 grams of sodium chloride and 50 grams of water were mixed to form a paste which was then air dried of 40° C. The dry powder thus made was found to be markedly superior in water-wettability and water-solubility rate as compared to a powder prepared by grinding these same ingredients together in the same proportions and in the dry state.

EXAMPLE NO. 9

Same as Example No. 8 but employing as the wetting agent sodium lauryl sulfate (Duponol ME). The same results reported in Example No. 8 were obtained.

EXAMPLE NO. 10

Same as Example No. 8 but employing as the wetting agent sodium alkyl benzene sulfonate (Ultrawet DS). The same results reported in Example No. 8 were obtained.

As will be apparent to those skilled in the art in the light of the accompanying disclosure, many modifications, changes and substitutions are possible in the practice of this invention without departing from the spirit or scope thereof.

I claim:

1. A method of improving the water-wettability of a normally solid, particle-form N-halo organic compound which comprises filtering an aqueous slurry halogenation reaction mixture containing said particle form N-halo organic compound as a reaction product therein to form a filter cake, directly washing said filter cake with a concentrated aqueous solution of a wetting agent to effect adsorption of said wetting agent on the surfaces of said N-halo compound recovering the resulting washed N-halo compound, now containing said wetting agent adsorbed on the surfaces thereof, and drying the resulting washed N-halo compound.

2. A method in accordance with claim 1 wherein said N-halo organic compound is trichloromelamine.

3. A method in accordance with claim 1 wherein said N-halo organic compound is 1,3-dichloro 5,5-dimethyl hydantoin.

4. A method in accordance with claim 1 wherein said N-halo organic compound is trichlorocyanuric acid.

5. A method in accordance with claim 1 wherein said N-halo organic compound is tribromomelamine.

6. A method in accordance with claim 1 wherein said N-halo organic compound is monobromodichloromelamine.

7. A method in accordance with claim 1 wherein said wetting agent is a sodium alkyl aryl sulfonate.

8. A method in accordance with claim 1 wherein said wetting agent is sodium lauryl sulfate.

9. A method in accordance with claim 1 wherein said wetting agent is an anionic wetting agent.

10. A method of manufacturing trichloromelamine having improved water-wettability which comprises chlorinating melamine in an aqueous medium by contact with chlorine in an amount sufficient to form trichloromelamine, filtering the produced trichloromelamine from the resulting aqueous chlorination reaction mixture to produce a filter cake and thereupon directly contacting the resulting cake of filtered trichloromelamine with an aqueous solution of sodium alkyl aryl sulfonate wetting agent to substantially completely wet the surfaces of the filtered trichloromelamine with said aqueous wetting agent solution, recovering the resulting wetted trichloromelamine and drying the recovered trichloromelamine under conditions such that said wetting agent is deposited on the surfaces of said trichloromelamine.

References Cited in the file of this patent

UNITED STATES PATENTS

| | | |
|---|---|---|
| 1,950,956 | Wilhelm | Mar. 13, 1934 |
| 2,863,800 | Gottfried | Dec. 9, 1958 |
| 2,913,460 | Brown et al. | Nov. 17, 1959 |
| 2,921,911 | Staubly et al. | Jan. 19, 1960 |